United States Patent
Bailey et al.

(10) Patent No.: US 10,107,931 B2
(45) Date of Patent: Oct. 23, 2018

(54) NOISE MEASUREMENT IN A LOCATING RECEIVER

(71) Applicant: The Charles Machine Works, Inc., Perry, OK (US)

(72) Inventors: Brian K. Bailey, Stillwater, OK (US); Michael F. Gard, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 416 days.

(21) Appl. No.: 14/746,275

(22) Filed: Jun. 22, 2015

(65) Prior Publication Data

US 2015/0369953 A1 Dec. 24, 2015

Related U.S. Application Data

(60) Provisional application No. 62/015,747, filed on Jun. 23, 2014.

(51) Int. Cl.
*G01V 3/08* (2006.01)
*G01V 3/38* (2006.01)
*G01V 3/12* (2006.01)

(52) U.S. Cl.
CPC .............. *G01V 3/38* (2013.01); *G01V 3/088* (2013.01); *G01V 3/12* (2013.01)

(58) Field of Classification Search
CPC ... G01V 3/00; G01V 3/08; G01V 3/81; G01V 3/10; G01V 3/101; G01V 3/102; G01V 3/104; G01V 3/105; G01V 3/107; G01V 3/108; G01V 3/15; G01V 3/16

USPC ................................................ 324/323, 326
See application file for complete search history.

(56) References Cited

U.S. PATENT DOCUMENTS

| | | | |
|---|---|---|---|
| 4,843,634 A | 6/1989 | Pike | |
| 6,496,008 B1* | 12/2002 | Brune | E21B 47/024 175/45 |
| 9,000,778 B2* | 4/2015 | Ziolkowski | G01V 15/00 324/600 |
| 9,354,033 B2* | 5/2016 | Hyacinthe | G01B 7/00 |
| 2002/0047709 A1* | 4/2002 | Fling | G01V 3/104 324/326 |
| 2003/0076093 A1 | 4/2003 | Lourens et al. | |
| 2008/0129610 A1 | 6/2008 | Tsfati et al. | |
| 2008/0252534 A1 | 10/2008 | Okayama et al. | |
| 2010/0001713 A1* | 1/2010 | Royle | G01V 3/081 324/67 |
| 2011/0001633 A1* | 1/2011 | Lam | G01V 3/15 340/853.1 |
| 2011/0109437 A1* | 5/2011 | Olsson | G01V 3/15 340/8.1 |
| 2011/0191058 A1* | 8/2011 | Nielsen | B65D 83/203 702/130 |
| 2012/0146647 A1* | 6/2012 | Candy | G01V 3/104 324/329 |

(Continued)

*Primary Examiner* — Tung X Nguyen
*Assistant Examiner* — Dominic Hawkins
(74) *Attorney, Agent, or Firm* — Tomlinson McKinstry, P.C.

(57) ABSTRACT

A method for choosing a frequency to locate an underground object. A locating receiver is provided with a display. The locating receiver scans multiple pre-selected frequencies to determine a noise level, or a signal-to-noise ratio. The locating receiver transmits the chosen frequency to a transmitter, which places the chosen frequency on the underground object to provide an optimal locating frequency.

18 Claims, 5 Drawing Sheets

(56) References Cited

U.S. PATENT DOCUMENTS

2012/0210562 A1 8/2012 Jones et al.
2013/0119992 A1 5/2013 Bailey

* cited by examiner

NOISE MEASUREMENT IN A LOCATING RECEIVER

CROSS REFERENCE TO RELATED APPLICATION

This application claims the benefit of U.S. provisional patent application Ser. No. 62/015,747, filed on Jun. 23, 2014, the entire contents of which are incorporated herein by reference.

FIELD

The present invention relates to the location of buried utilities such as pipes or cables, and particularly to the measurement of noise and the signal-to-noise ratio at various locating frequencies to improve location accuracy.

SUMMARY

The present invention is directed to a locating system for locating an underground object. The system comprises a locating receiver, a processor and a display. The locating receiver has a locate mode and a noise mode. The locating receiver is configured to take a noise measurement at a plurality of locating frequencies when in noise mode. The processor is configured to output a plurality of frequency data entries corresponding to the noise measurement. The display displays frequency data entries. The locating receiver detects an electromagnetic field strength at a chosen frequency selected from the displayed frequency data entries when in the locate mode.

The present invention is also directed to a method for detecting an underground object. The method comprises providing a locating receiver capable of detecting a plurality of locate frequencies. A noise measurement is taken at the plurality of locate frequencies with the receiver. Frequency data entries corresponding to the plurality of noise measurements are displayed and a chosen frequency corresponding to a frequency data entry is chosen.

DESCRIPTION OF THE PREFERRED EMBODIMENT

Buried utilities in the form of lines, cables, conduits, pipelines, and other structures are used to supply a variety of utilities. Locating these utilities after installation is necessary in order to repair or replace them. Locating them is also necessary to avoid disturbing or damaging them when excavating for any other purpose.

One method of locating buried utilities is to conductively or inductively apply a signal to the utility so electrical current flows on it. This current produces a magnetic field along the full length of the buried utility. An electromagnetic line locator can then be used above the ground to trace the path of the buried conductor or to precisely determine its location. Nonconductive utilities may also be installed with a conductive tracer wire that runs the length of the utility and can be used to locate the utility.

Locating receivers and transmitters generally contain a predefined set of frequencies. With this limited set of frequencies, it is possible to have more than one locating transmitter in the same area operating at the same frequency. If two transmitters are connected to different utilities in close proximity, both utilities will have a strong magnetic field at the locate frequency. This situation can lead to errors in determining the location of a utility or mistaking another utility for the intended utility. Having two transmitters connected to utilities in reasonably close proximity or connected to the same utility can also cause beat frequency oscillations. This oscillation can confuse the locator operator and/or cause error in locating and depth measurements. This and other issues with locating with two or more transmitters in close proximity demonstrate the need to detect the presence of another transmitter operating at or near a given frequency.

Noise from other sources can be a problem when locating a buried utility. Examples of these sources include utility power grid transmission lines, radio, satellite, radar, telecom transmissions, spurious emissions from electronic equipment, lightning, and solar events. Any of these sources can interfere with proper operation of a locating receiver since the noise adds to the locating signal. These sources may vary in the frequency spectra they affect; some are narrow band while others are wide band. These sources of noise can have varying effects on different locating frequencies. As noise adversely impacts locating performance, there is a need to determine the level of noise at the frequencies used for locating.

Figure 1:
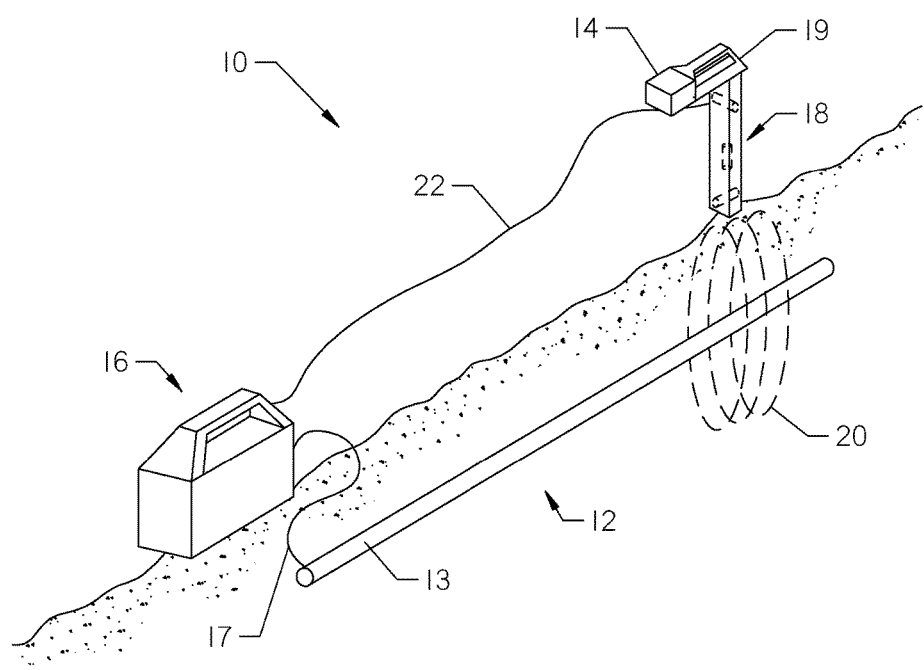
FIG. 1 is a diagrammatic representation of a system for locating an underground line.

With reference now to FIG. 1, shown therein is a general representation of a system 10 for locating an underground object 12. The underground object 12, as shown in FIG. 1, comprises a buried cable or utility line 13. One of ordinary skill in the art can appreciate that the underground object 12 may alternatively comprise a buried object such as a downhole beacon located proximate a drilling head of a drill string (not shown), a conductive pipe, a non-conductive pipe having a tracer wire, or other objects.

The system 10 comprises a locating receiver, or locator 14 and a transmitter 16. The locator 14 is preferably a portable device capable of detecting magnetic fields generated by currents at certain frequencies. The locator 14 comprises one or more antennas 18 for detecting such fields and a processor 19 for analyzing information. The antenna 18 may comprise a ferrite or air-cored solenoid antenna, and is preferably oriented horizontally, vertically, or mutually orthogonal (as shown in FIG. 1) to the horizontal and vertical axis, assuming that the locator 14 is held in a predetermined orientation and that the antenna 18 moves with the locator. The antenna 18 may alternatively comprise other antenna types, such as loop antennas.

The locator 14 generally is adapted to receive signals 20 generated by the transmitter 16 as discussed below. However, one of skill in the art will appreciate that locators 14 may detect signals generated from other sources (not shown), such as power grid components, cathodic protection systems, and communications devices. The locator 14 is adapted to detect signals 20 from a plurality of discrete frequencies.

The transmitter 16 is used to apply a signal 20, usually in the form of an alternating electrical current of a specific frequency or frequencies, to the buried utility line 13. The transmitter 16 may apply this current to the utility line 13 by direct electrical connection 17 or by electromagnetic induction (not shown). The current flowing along the entirety of the utility line 13 as a result of the transmitter 16 radiates the signal 20 in the form of a magnetic field outward from the line.

The locator 14 and transmitter 16 may cooperate in the determination of the signal 20 frequency to place on a buried utility line 13. For example, an operator may choose a preferred frequency at the locator 14, which then transmits the frequency information to the transmitter 16, allowing the transmitter to apply a signal 20 at that frequency to the buried line 13. The locator 14 may alternatively automatically choose the frequency prior to transmitting this information to the transmitter 16. The transmission of data between the locator 14 and the transmitter 16 occurs through communication link 22, which may comprise a wireline, wireless communication, Bluetooth, or other known means.

The antenna 18 detects an electromagnetic field at a given frequency. This field may be due to the signal 20 placed on the line 13 by the transmitter 16. However, other sources of electromagnetic field may exist at the given frequency. Any electromagnetic field not generated by the signal 20 may be considered "noise" for locate operations. Noise measurements may be made by the antenna 18 based upon the vector sum of three mutually orthogonal antenna components without regard for the orientation of the locator 14 or the noise source. Alternatively, such measurements may be detected by a single-axis antenna 18.

Figure 2:
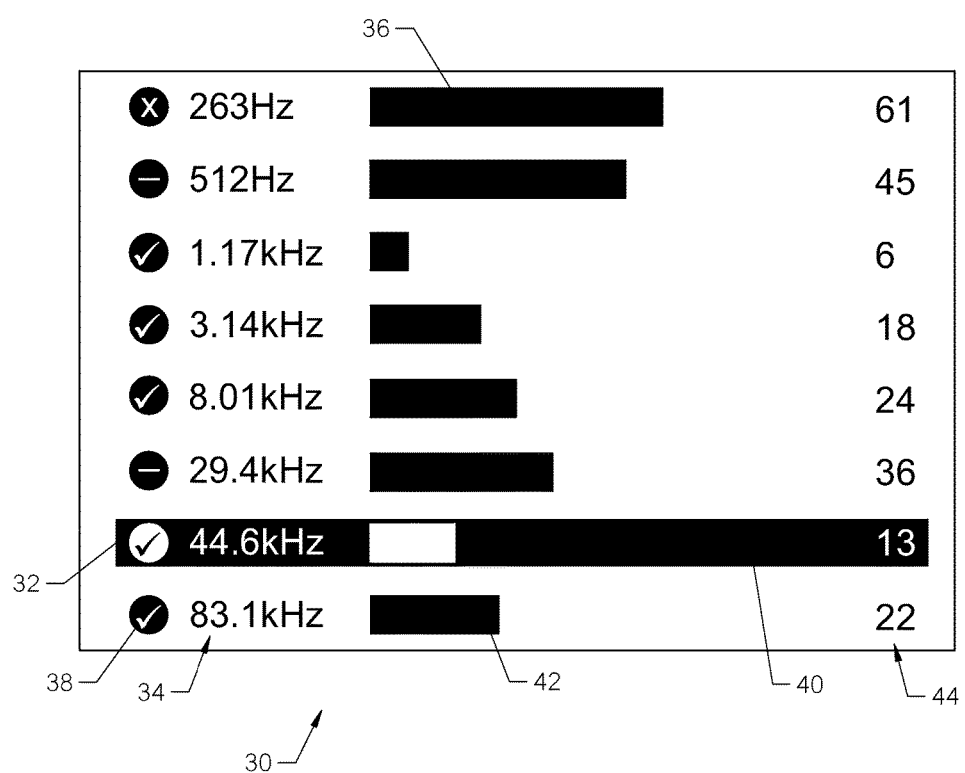
FIG. 2 is a representation of a screenshot of the display of the system of FIG. 1.

With reference now to FIG. 2, a representative display 30 of the locator 14 is shown. The display 30 shows a plurality of frequency data entries 32. The frequency data entries 32 are representative of noise levels when the transmitter 16 is turned off. The frequency data entries 32 comprise a frequency indicator 34, a scale 36, and a quality indicator 38. Each of the frequency data entries 32 represents data about the noise level at the frequencies indicated at each frequency indicator 34. As shown, the frequencies listed in the frequency indicators 34 range from 263 Hz to 83.1 kHz. One of ordinary skill in the art will appreciate that these representative predetermined frequencies are shown herein for illustrative purposes, and alternative frequencies may be utilized by the locator 14 without departing from the spirit of this invention. Further, each frequency displayed on the frequency indicator 34 may represent a bandwidth of frequencies containing the displayed frequency. For example, an indicated frequency of 500 Hz may represent a bandwidth range of 2% to 5%. The bandwidth must be broad enough to account for ordinary tuning error between the transmitter 16 and locator 14, but narrow enough to limit interference associated with other electromagnetic noise.

In operation, the locator 14 (FIG. 1) is placed into a noise measurement mode, as represented by the display 30. The locator 14 detects the ambient electromagnetic signal (or "noise") at each of the frequencies listed on the frequency indicators 34. As shown, there are eight frequency indicators 34, but more may be used and a scrolling function may allow an operator to view many frequency indicators on the display 30. The locator 14 may do this automatically or upon prompting from an operator. The detection may be sequential or simultaneous. As shown in FIG. 2, a frequency data entry 32 is given an active detection indication 40 when that frequency is being actively detected by the locator 14. The active detection indication 40 may take the form of a highlighted frequency data entry 32, and may allow for live updating of the scale 36 and quality indicator 38. During simultaneous measurement, all displayed frequencies may be periodically measured and updated.

The relative strength of the electromagnetic noise is shown in the scale 36 of the frequency data entry 32. The scale 36 may be represented by a line, a number, or any representation of relative noise. The representation may be tied to a raw noise level, a mathematical reference number, or the like. As shown, noise is represented on the display 30 by a bar graph 42 and number 44. The bar graph 42 and number 44 are preferably logarithmically scaled, though other means of reducing dynamic range or a simple linear scale may also be utilized. The quality indicator 38 may be utilized to indicate or categorize the relative suitability of a frequency as indicated by the frequency data entry 32. As shown, the quality indicator 38 displays an "X" indicating a high noise level, a "-" representing a moderate noise level, and a check mark representing a low noise level. Colors, faces, and other quality indicators 38 may be utilized to categorize frequencies or to indicate the best frequency to an operator. Quality indicators 38 may be based upon the relative levels of detected ambient noise between frequencies, or may be compared to predetermined noise thresholds. Alternatively, the processor 19 of the locator 14 may automatically choose the best frequency and communicate this frequency to the transmitter 16. It is understood that a low noise level is advantageous when actively locating a buried wire 13 in what is known in the art as an "active locate operation." As will be described with reference to FIG. 5 below, a "passive locate operation", or one without the use of a transmitter 16 to induce or inject a signal, finds a buried wire 13 through the use of noise. Thus, in passive locate operations, the quality indicator 38 may favorably indicate the suitability of a frequency when a noise level associated with a frequency data entry 32 is high.

Figure 3:
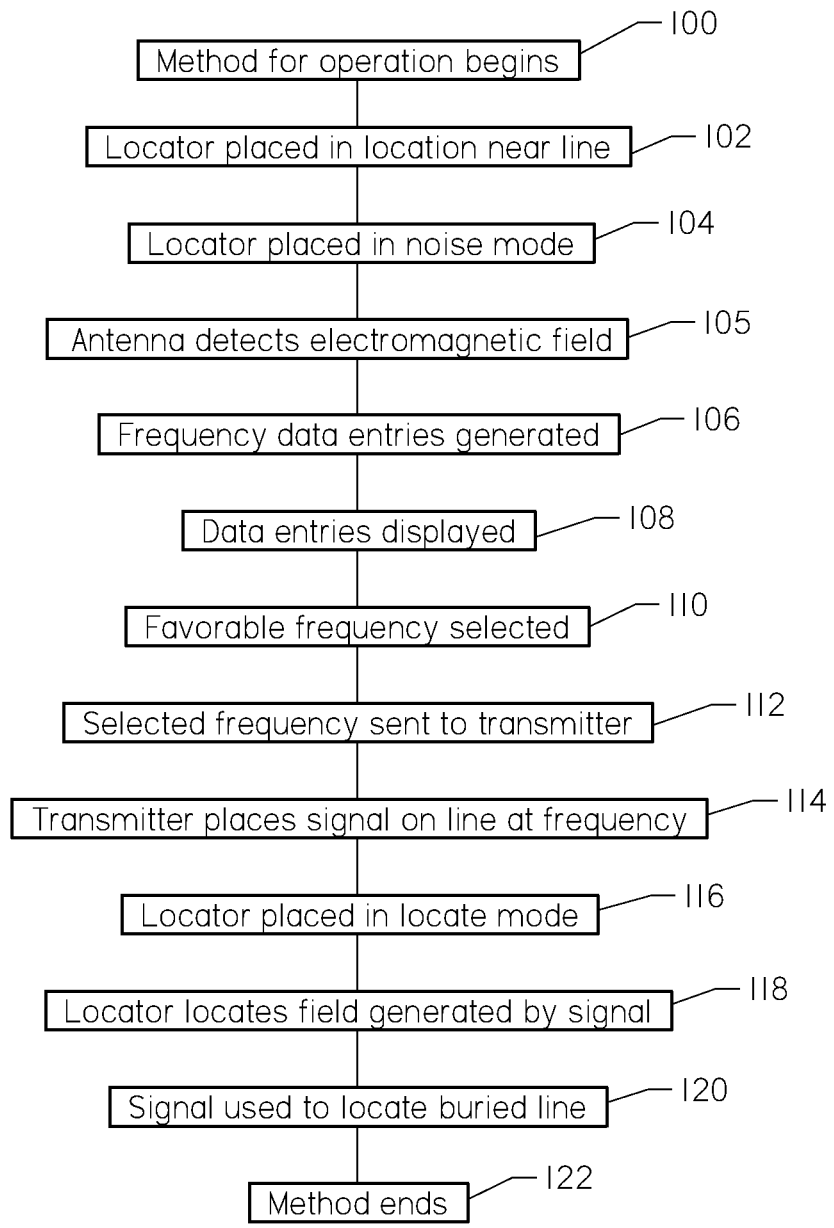
FIG. 3 is a flowchart of a method for determining an optimum frequency for use with the system of FIG. 1.

With reference now to FIG. 3, a method for active location mode operation of the system 10 is shown. The method starts at 100. The locator 14 is placed in a location where a line 13 is to be located at 102. The locator 14 is placed in a noise mode at 104. The antenna 18 of the locator 14 detects the ambient electromagnetic field at a plurality of predetermined frequencies at 105, either sequentially or simultaneously. A frequency data entry 32 is generated for each frequency at 106 and displayed on the display 30 at 108. A frequency with a favorable quality indicator 38 is chosen at 110, either by the operator or the processor 19. The chosen frequency is transmitted to the transmitter 16 at 112. The transmitter 16 causes the signal 20 to be placed on the buried line 13 at the chosen frequency at 114. The locator 14 is placed in a locate mode, either by the operator or automatically, at 116. At 118, the locator 14 locates the electromagnetic field generated by the signal 20. The operator then utilizes the signal 20 to locate the buried utility line 13 at 120. The method ends at 122.

One of skill will appreciate that the noise level at a locator 14 may change based upon the location of the locator. For example, when in locate mode, the locator may be moved into a location where the chosen frequency is no longer optimal for the locate operation. In such a situation, the locator 14 may be placed into noise mode at 104 periodically and the subsequent steps of FIG. 3 may be repeated to improve the effectiveness of the locate operation.

Figure 4:
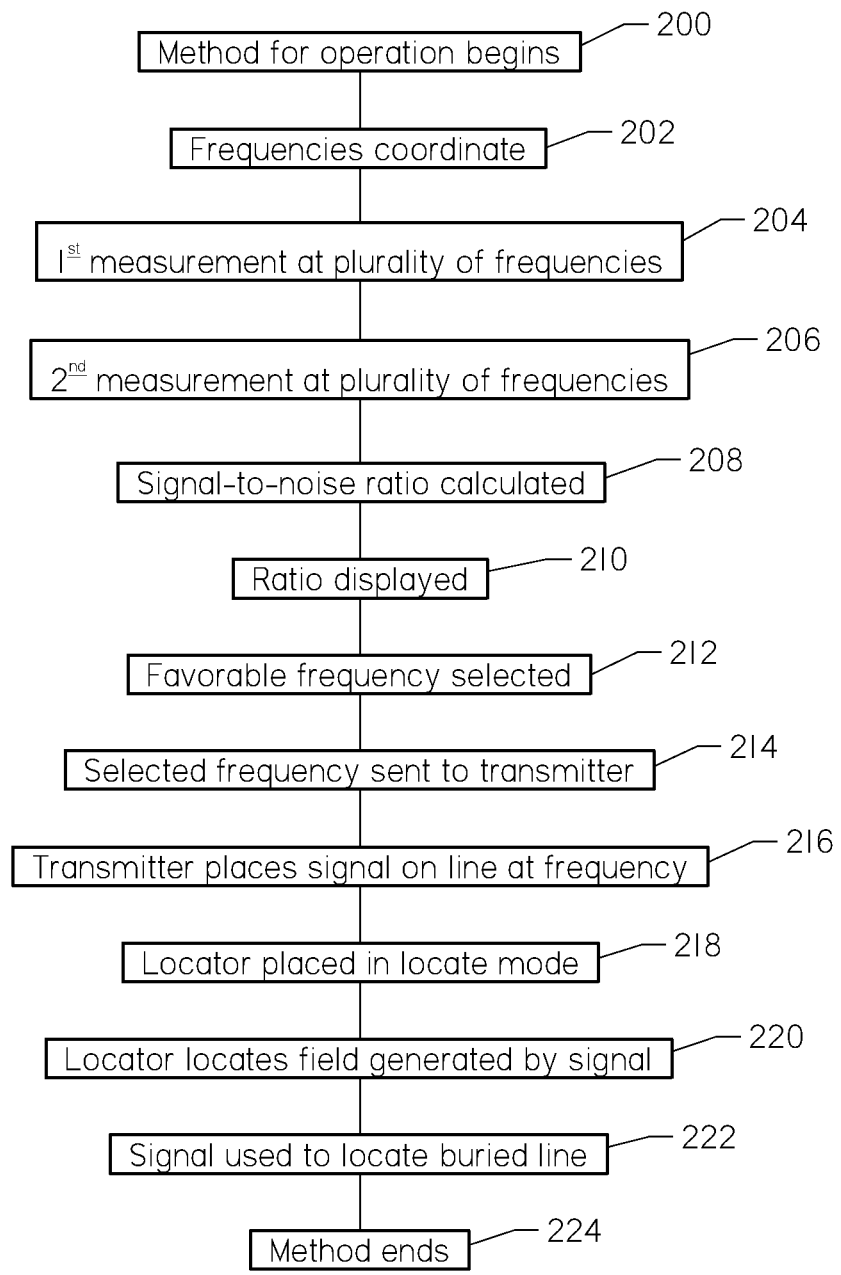
FIG. 4 is a flowchart of an alternative method for determining an optimum frequency for use with the system of FIG. 1.

With reference now to FIG. 4, an alternative method for utilizing system 10 in active location mode is shown. While the noise level displayed on the frequency data entry 32 is sufficient for choosing a frequency in most operations, location operations that take place in areas with multiple active buried lines or where precise depth measurements are needed may utilize a "signal-to-noise" ratio which takes into account the relative strength of the signal induced by the transmitter to the ambient noise at the chosen frequency.

The method starts at 200. The locator 14 and transmitter 16 coordinate their frequencies at 202. A first measurement is made at a plurality of predetermined frequencies at 204 with no signal 20 on the buried utility 13 (FIG. 1). A second measurement is made at the plurality of predetermined frequencies at 206 with the signal 20 placed on the buried utility 13 at the plurality of predetermined frequencies by the transmitter 16. The signal 20 may be constant, or may be variable. The processor 19 calculates the signal-to-noise ratio at 208. The signal-to-noise ratio is displayed on the display 30 for each of the frequencies at 210. A frequency with a favorable quality indicator 38 is chosen at 212, either by the operator or the processor 19. The chosen frequency is transmitted to the transmitter 18 at 214. The transmitter 16 causes the signal 20 to be placed on the buried line 13 at the chosen frequency at 216. The locator 14 is placed in a locate mode, either by the operator or automatically, at 218. At 220, the locator 14 locates the electromagnetic field generated by the signal 20. The operator then utilizes the signal 20 to locate the buried utility line 13 at 222. The method ends at 224.

The methods for calculating signal-to-noise ratio at 208 may differ depending on the application. For simple locates, a quick approximation of signal-to-noise ratio may be made. In this calculation, the first measurement taken, N, is assumed to be uncorrelated additive noise, typically white Gaussian noise. The second measurement (with transmitter 16 transmitting) represents the quadrature sum of the noise-free signal, S, and the noise, N. The noise-corrupted signal, $S_n$, is given by $S_n = \sqrt{S^2 + N^2}$. The noise-free signal, S, may be estimated using these two measurements and the relationship $S = \sqrt{S_n^2 - N^2}$.

The signal-to-noise ratio is calculated using $$SNR = \frac{S}{N}$$

where SNR is the signal-to-noise ratio, S is the noise-free signal, and N is the noise. Coordination of the transmitter 16 and the locator 14 is required to properly measure SNR. While this could be done by two or more individuals coordinating the transmitter 16 frequency with the locator 14 measurements, the transmitter 16 output and locator 14 measurements are preferably coordinated by the processor 19 while operably connected to the transmitter 16 by a communication link 22. The communication link 22 may also facilitate the changing of transmitter 16 frequencies necessary to measure SNR at multiple frequencies.

In addition, signal-to-noise ratio may be calculated at 208 by more precise techniques, when desired for highly precise applications. The transmitter 16 may be configured to force a higher signal current, $I_2$, to be a known multiple, n, of the normal locating current $I_1$; that is, $I_2 = nI_1$. This relationship between the higher signal current and normal locating current can be an arbitrary constant n, such that n is greater than one. For the purposes of this disclosure, n=2.

This disclosure assumes the locator 14 has been properly oriented by conventional procedures, is directly above the line being located with the antenna 18 oriented for maximum signal (horizontal, above, and normal to the line being located), and is being maintained at a uniform separation from the line 13. The frequency and channel gain are assumed to remain constant. The noiseless signals in response to $I_1$ and $I_2$ will be $$S_1 = \left(\frac{I_1}{d}\right) \text{ and } S_2 = \left(\frac{I_2}{d}\right) = \left(\frac{nI_2}{d}\right)$$

Where d is the distance between the antenna 18 and the line 13. If the signal channel contains noise of amplitude N, the signals actually received and measured in response to the measured signals $S_1$ and $S_2$ will be given by:

$$M_1 = \sqrt{S_1^2 + N^2}$$

and $$M_2 = \sqrt{S_2^2 + N^2} = \sqrt{(nS_1)^2 + N^2}$$

For the purposes of choosing an optimum frequency, the SNR of each signal channel at the normal operating current level $I_1$ is $S_1/N$. This may be determined analytically by the following operations:

Form the ratio, R, of the two measured readings $M_2$ and $M_1$, $$R = \frac{M_2}{M_1} = \sqrt{\frac{n^2 S_1^2 + N^2}{S_1^2 + N^2}}$$

Squaring both sides and collecting terms yields $$S_1^2(R^2 - n^2) = N^2(1 - R^2)$$

which leads to the desired result $$\frac{S_1}{N} = \sqrt{\frac{1 - R^2}{R^2 - n^2}}$$

In practice, the measured reading ratio R will usually be larger than unity unless the measured signals $M_2$ and $M_1$ are completely dominated by noise. $1 \leq R \leq n$. This means both numerator and denominator in the above result will be negative. For computational simplicity, we use the equivalent result $$\boxed{SNR = \frac{S_1}{N} = \sqrt{\frac{R^2 - 1}{n^2 - R^2}}}$$

Figure 5:
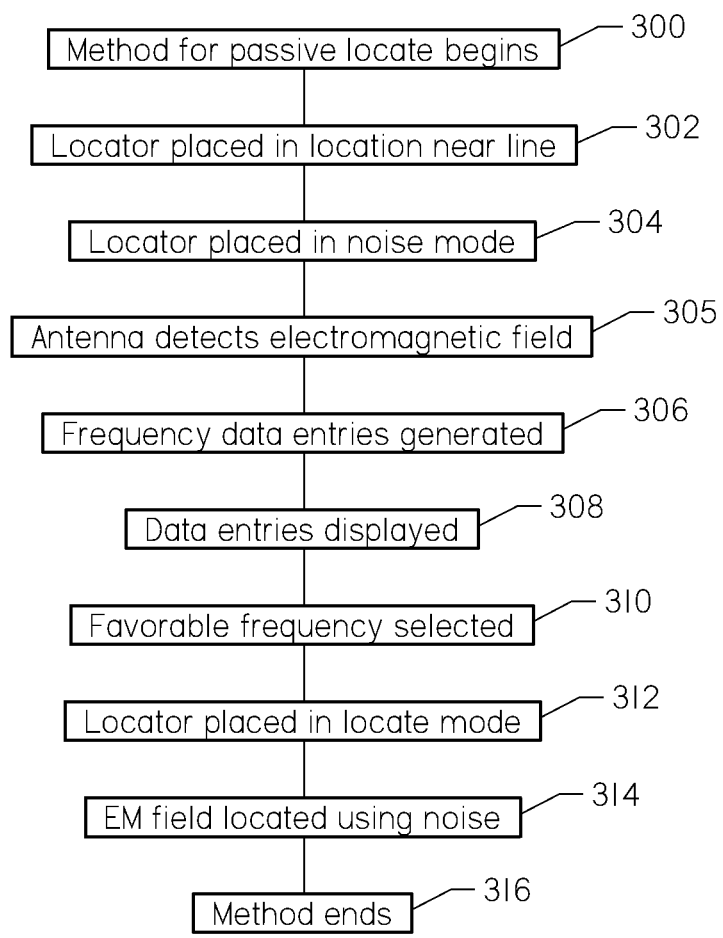
FIG. 5 is a flowchart of a passive location method for use with a locator.

With reference now to FIG. 5, a method for passive location of the buried wire 13 is disclosed. One of skill in the art will appreciate that while it is preferred to utilize transmitter 16 to energize a buried wire 13, sometimes, the line or lines being located will be inaccessible to apply the transmitter. In such situations, a "passive locate" is utilized to find buried wires 13 with no transmitter capable of inducing a signal. Buried electric wires will have an electric current on the wire at 60 Hz or 120 Hz. Signals characteristic of power distribution lines are typically located at harmonics of the power line frequency, such as 300 Hz and 420 Hz.

When performing a passive locate, the "noise" detected in noise mode should be considered a signal indicative of an underground utility.

A method for passive location begins at 300. The locator 14 is placed in a location where a line 13 is to be located at 302. The locator 14 is placed in a noise mode at 304. The antenna 18 of the locator 14 detects the ambient electromagnetic field at a plurality of predetermined frequencies at 305, either sequentially or simultaneously. A frequency data entry 32 is generated for each frequency at 306 and displayed on the display 30 at 308. A frequency with a favorable quality indicator 38 is selected at 310, either by the operator or the processor 19. The locator 14 is placed in a locate mode, either by the operator or automatically by the processor, at 312. At 314, the locator 14 locates the electromagnetic field utilizing the noise information found at 306 to locate the buried utility line 13. The method ends at 316.

The method and system herein is used with a buried line 13. One of ordinary skill may appreciate that the underground object 12 may alternatively be a beacon and the locator 14 may be a walk-over tracking receiver such as that disclosed in U.S. Pat. No. 8,497,684 issued to Cole, et. al., the contents of which are incorporated herein by reference. The system 10 of the present invention may be used to choose an optimum frequency for a signal transmitter located in a single-location source such as a beacon without departing from the spirit of this disclosure. Further, while the disclosure is directed to the problem of underground objects, wires and utility lines may be in above-ground inaccessible locations such as concrete slab foundations where the system 10 is advantageous.

What is claimed is:

1. A method comprising:
   coordinating frequencies between a signal transmitter and a utility locator;
   taking a first measurement with the utility locator at a plurality of frequencies with no signal transmitted by the signal transmitter;
   placing a signal on a buried utility with the signal transmitter;
   taking a second measurement with the utility locator at at least one frequency while the signal is placed on the buried utility by the signal transmitter;
   calculating a signal-to-noise ratio using the first and the second measurement;
   choosing a favorable frequency with a favorable quality indicator based upon the first and the second measurement;
   thereafter, placing a locate signal on the buried utility with the signal transmitter at the favorable frequency; and
   locating the buried utility by detecting the locate signal with the utility locator.

2. The method of claim 1 wherein the signal is placed on the buried utility through direct electrical connection between the buried utility and the transmitter.

3. The method of claim 1 wherein the signal transmitted by the signal transmitter has a variable magnitude.

4. The method of claim 1 in which the favorable frequency is automatically chosen by a processor.

5. The method of claim 1 in which the buried utility comprises a utility wire.

6. The method of claim 1 in which the buried utility comprises a conductive pipe.

7. The method of claim 1 in which the buried utility comprises a non-conductive pipe with a tracer wire.

8. The method of claim 1 further comprising displaying the signal-to-noise ratio at the plurality of frequencies simultaneously.

9. The method of claim 1 wherein the plurality of frequencies are in the range bounded by 250 Hz and 100 kHz.

10. The method of claim 1 wherein each of the plurality of frequencies has a bandwidth range of 2% to 5%.

11. The method of claim 1 in which the second measurement is taken at the same plurality of frequencies as the first measurement.

12. The method of claim 1 in which the second measurement is taken at one of the plurality of frequencies as the first measurement.

13. The method of claim 1 in which the favorable quality indicator is noise level.

14. The method of claim 1 in which the favorable quality indicator is the calculated signal-to-noise ratio.

15. The method of claim 1 in which the favorable quality indicator is a representation of relative noise.

16. The method of claim 1 in which the first measurement is taken simultaneously at the plurality of frequencies.

17. The method of claim 1, further comprising:
   taking the first measurement and second measurement at a first location;
   repeating the first measurement and the second measurement at a second location;
   determining and choosing a second favorable frequency with a favorable quality indicator based upon the first and the second measurement at the second location; and
   placing a locate signal on the buried utility with the signal transmitter at the second favorable frequency while locating the buried utility with the utility locator at the second location.

18. The method of claim 17, wherein the favorable frequency and second favorable frequencies are different frequencies.

* * * * *